(No Model.)
H. C. KELLY, Jr.
PNEUMATIC CONVEYER.
No. 494,274.    Patented Mar. 28, 1893.
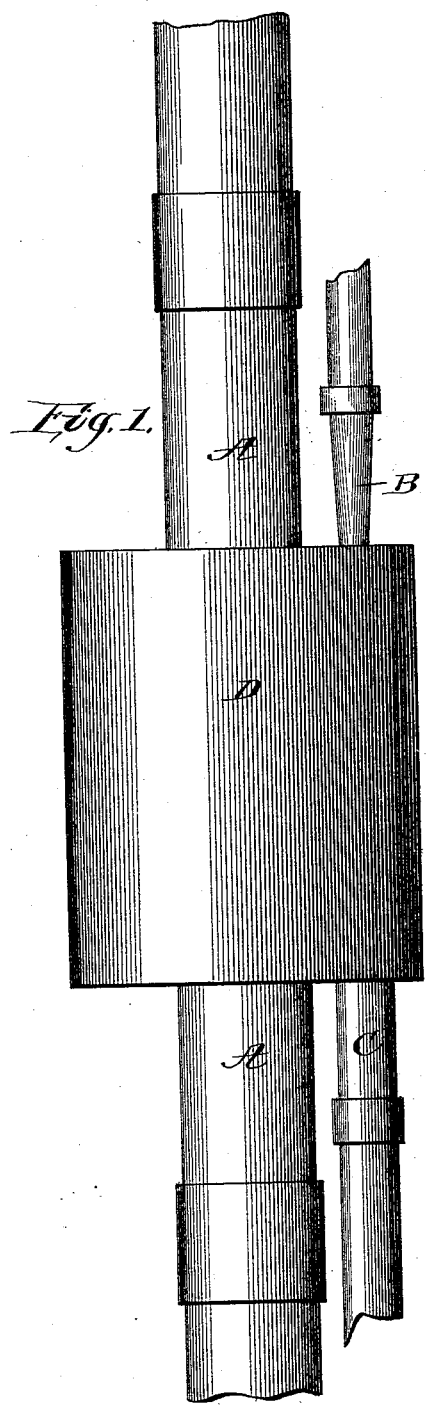
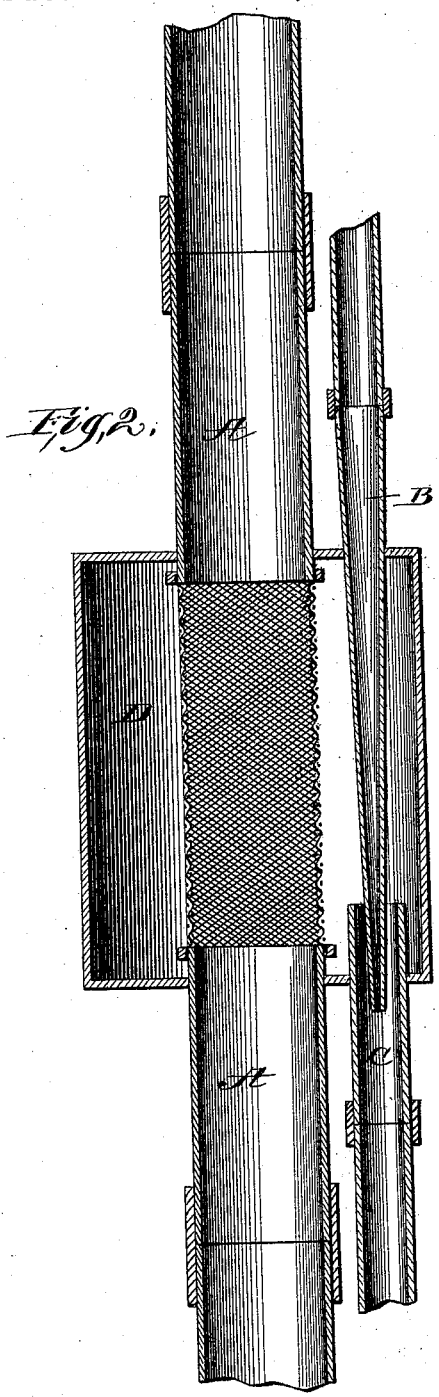
Witnesses:
Ambrose Risdon
Frank L. Stevens
Inventor:
Henry C. Kelly Jr.
By Cyrus Kehr
Atty

UNITED STATES PATENT OFFICE.

HENRY C. KELLY, JR., OF CHICAGO, ILLINOIS.

PNEUMATIC CONVEYER.

SPECIFICATION forming part of Letters Patent No. 494,274, dated March 28, 1893.

Application filed December 12, 1891. Serial No. 414,779. (No model.)

*To all whom it may concern:*

Be it known that I, HENRY C. KELLY, Jr., a citizen of the United States, residing at Chicago, in the county of Cook and State of Illinois, have invented certain new and useful Improvements in Pneumatic Conveyers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention relates particularly to mechanism for exhausting and diverting the air from a pneumatic conveyer pipe.

In the accompanying drawings—Figure 1 is an elevation. Fig. 2 is a vertical, central section.

D is a sealed chamber of cylindric or other suitable form. A is a conveyer pipe. This extends through the chamber D, the joint between the tube and the walls of the chamber D around the openings through which said tube extends being sealed against the passage of air. The pipe A is preferably of substantially uniform diameter. Within the chamber D, said pipe A is perforated to allow the passage of air and small particles of solid matter. This portion of said pipe may be of wire netting or of perforated sheet-metal. C is a pipe leading from the chamber D. B is a nozzle extending, preferably, through the wall of the chamber D opposite the pipe C into said pipe C, so that the point of the nozzle is directed away from the chamber D. The upper end of the pipe A is to lead from the point from which matter is to be conveyed. The lower end of the pipe A is to lead to the place of delivery of the material to be conveyed. The upper end or base of the nozzle B is to be connected with a pipe leading from a source of steam supply, while the pipe C is to lead into the atmosphere or a sewer or any suitable receptacle for receiving the small particles conveyed through the pipe C. In separating dust from grain or ore, the material to be operated upon is drawn through the pipe A into the portion of said pipe located within the chamber D. The lighter particles are here drawn laterally by the air being exhausted through the perforations in said pipe, while the heavier particles fall on account of momentum obtained before entering the portion of the pipe A located within the chamber D. The apparatus may also be used for carrying shells for conveying messages or merchandise past the point on said pipe at which the chamber D is located, the air being exhausted through the perforations of said pipe, and the shell passing said point on account of gravity or momentum or both. It will be seen that the matter passing through the pipe A beyond the chamber D is guided all along its course by the walls of the pipe A, and that the course of said pipe through said chamber is direct so that the materials going through said conveyer past the foraminous part of the latter need not change course. Thus the materials are not retarded by change of course at the particular time when the air leaving the conveyer tends to draw them against the wall of the conveyer. It is also to be observed that the shells are aided in their passage by the continuity and uniformity as to diameter of the wall of the conveyer pipe, A.

I claim as my invention—

1. In a pneumatic conveyer, the combination of a chamber D, a pipe A of substantially uniform diameter extending in a substantially straight line through and being foraminous within said chamber, a pipe C leading from said chamber at one side of said pipe A, and a steam nozzle B entering said pipe C and directed away from said chamber D, substantially as shown and described.

2. In a pneumatic conveyer, the combination of a chamber D, a pipe A of substantially uniform diameter extending in a substantially straight line through and being foraminous within said chamber, a pipe C leading from said chamber, and a steam nozzle B extending through said chamber D and into the pipe C, substantially as shown and described.

In testimony whereof I affix my signature, in presence of two witnesses, this 4th day of December, 1891.

HENRY C. KELLY, JR.

Witnesses:
AMBROSE RISDON,
CYRUS KEHR.